United States Patent [19]

Finlay

[11] 4,086,658
[45] Apr. 25, 1978

[54] INPUT/OUTPUT AND DIAGNOSTIC ARRANGEMENTS FOR PROGRAMMABLE MACHINE CONTROLLERS HAVING MULTIPROGRAMMING CAPABILITIES

[75] Inventor: David Ernest Finlay, Boulder, Colo.

[73] Assignee: International Business Machines Corporation, Armonk, N.Y.

[21] Appl. No.: 729,451

[22] Filed: Oct. 4, 1976

[51] Int. Cl.² .............................................. G06F 13/00
[52] U.S. Cl. .................................................... 364/900
[58] Field of Search ... 364/200 MS File, 900 MS File

[56] References Cited

U.S. PATENT DOCUMENTS

| | | | |
|---|---|---|---|
| 3,238,510 | 3/1966 | Ergott, Jr. | 340/172.5 |
| 3,601,812 | 8/1971 | Weisbecker | 340/172.5 |
| 3,748,650 | 7/1973 | Garcia et al. | 340/172.5 |
| 3,771,131 | 11/1973 | Ling | 340/172.5 |
| 4,020,470 | 4/1977 | Drimak et al. | 364/200 |

OTHER PUBLICATIONS

Motorola M6800 Application Manual, 1975, p.3-1.

*Primary Examiner*—Raulfe B. Zache
*Attorney, Agent, or Firm*—Herbert F. Somermeyer

[57] ABSTRACT

A programmable controller includes a random access memory for storing signals relating to a plurality of programs executable in the controller. A portion of the memory addressing is zoned for enabling one or more programs to have exclusive access to that zone. The addressability of input/output registers, diagnostic registers and selected other units of common interest to all such programs are addressable in each of the plurality of zones as if such registers were uniquely assigned to such respective memory zones.

14 Claims, 8 Drawing Figures

| INSTR | SEQ 1 | | SEQ 2 | | SEQ 3 | | SEQ 4 | | SEQ 5 | | SEQ 6 | |
|---|---|---|---|---|---|---|---|---|---|---|---|---|
| | CL | ALU | CL | ALU | CL | ALU | CL | ALU | CL | ALU | CL | ALU |
| AR SR LR | IBL | M | (TB→IB) IRH | X | PCI | NOTE 4 | (TERM) | NOTE 4 | | | | |
| LRE LRD | IBL | M | (TB→IB) IRH | X | PCI | NOTE 5 | WRT IRL | NOTE 5 | WRT IRH | TBNS (XX→DB) ACH+DO | | TBNS |
| STR | PCI | M | (TB→IB) WRT IRH | X (X→DB) ACH→DO | WRT IRL | ACL→DO | (TERM) | TBNS | | | | |
| AI SI | PCI | M | PCI | M NOTE 1 ACL×TB DO ACL | (TERM) | NOTE 5 | | | | | | |
| CB CI GPI LI XI OI NI AB SB LB XB OB NB | PCI | M | PCI | M ACL×TB DO ACL | (TERM) | X | | | | | | |
| STB | PCI | M | TB | M (ACL→DO) | (TB→IB) PCI | X | (TERM) | ACL ± TB DO ACL | | | | |
| AI SI SHL SHR | PCI | M | WRT TB | ACL→DO | (TB→IB) PCI | X | (TERM) | X | | | | |
| TRA | PCNI | M | (TB→IB) PCI | NOTE 2 | (TERM) | NOTE 2 | | | | | | |
| CLA IC | PCI | M | (TERM) | NOTE 3 | | | | | | | | |
| TBP TBR | PCI | M | (TERM) | X COT≠EQ | | | | | | | | |
| POR (IJD) | PCI | CL AC SET IC | (TERM) | ACL M DO ACL | | | IB→"CLA" POR CODE | X RST LOGIC 32→DO | | | | |
| TIME | Ø2 220 Ø1 | | Ø2 Ø1 | | Ø2 Ø1 | | Ø2 Ø1 | | Ø2 Ø1 | | Ø2 Ø1 Ø2 | |

NOTE 1: ACL ± TB + DB → ACH ; ACH → DO → ACL
NOTE 2: ACL MODIF → DB → ACH ; ACH → DO → ACL
NOTE 3: ACL → DB → ACH ; ACH → DO → ACL

NOTE 4: ACL ± TB → DB → ACH ; ACH → DO → ACL
NOTE 5: ACL + Δ → BB → ACH ; ACH → DO → ACL

| INSTR | SEQ 1 | | SEQ 2 | | SEQ 3 | | SEQ 4 | | SEQ 5 | | SEQ 6 | |
|---|---|---|---|---|---|---|---|---|---|---|---|---|
| | CL | ALU | CL | ALU | CL | ALU | CL | ALU | CL | ALU | CL | ALU |
| BAL | PCI | ← | IB SET PCI | (ACH→DO) ACL→DB | NOTE 7 | PCL→DO | WRT IRH | PCH-1 +CR →DO | NOTE 9 | NOTE 10 | (TERM) | SET TRA |
| RTN | IBL | | IRH | NOTE 5 | IRL+8 | (ACH→DO) ACL→DB | NOTE 8 | NOTE 10 | PCI | NOTE 11 | (TERM) | (ACL→DO) |
| BØØ | PCNI | PREVIOUS INSTRUCTION | NOTE 3 | PCH-1 →AOH | PCI | X | (TERM) | X | | | | |
| B̄ØØ | PCI | | PCI | X | (TERM) | X | | | | | | |
| IJO | PCNI | | NOTE 4 | PCH-1 →ACH | PCI | X | (TERM) | X | | | | |
| ĪJO | PCI | | (TERM) | X | | | | | | | | |
| BLI | IBL | | (TB→IB) IRH | NOTE 5 | PCI | (ACH→DO) ACL→DB | ACL→AOH TB→AOL | NOTE 10 | (TERM) | ITAL | | |
| BSI | IBL | | (TB→IB) IRH | NOTE 5 | PCI | (ACH→DO) ACL→DB | WRT ACL→AOH TB→AOL | NOTE 10 | (TERM) | TBNS | | |
| IN | PCI | | OUT 1st WRT TB | NOTE 6 | OUT 2nd WRT TB | ACL→DO | (TB→IB) PCI | X | (TERM) | IOD AC7* →EQ | | |
| OUT | PCI | | OUT 1st WRT TB | NOTE 6 | OUT 2nd WRT TB | ACL→DB ACH→DO | (TB→IB) PCI | X | (TERM) | IOD AC7* →EQ | | |
| INTERUPT 1-5 | NOTE 1 | ACL-1→DO | STR ACH WRT 4H | NOTE 5 | STR LOW AC WRT 4L | ACL→DB ACH→DO | STR OLD STAT WRT 8L | TBNS STAT DO→ACL | HI ADD READ 12H | TBNS PCL→DO →ACL | (TERM) | |
| INTERUPT 6-10 | NOTE 2 | ACL-1→DO | STR PCH WRT ØH | PCH-1 +CR →DO | NEW STAT 8H | X | NOTE 9 | NOTE 10 | PCI | UPDATE STAT | (TERM) | |
| | ø2 | ø1 | ø2 | ø1 | ø2 | ø1 | ø2 | ø1 | ø2 | ø1 | ø2 | |

NOTE 1: LOW ADDRESS READ 12L
NOTE 2: STR PCL WRT ØL
NOTE 3: CAL HIGH BITS ; TB→AOL
NOTE 4: CAL HIGH BITS, IB→AOL
NOTE 5: ACL→DB→ACH ; ACH→DO→ACL
NOTE 6: TB (MODIFIED) →DO
NOTE 7: SET IB TO "TRAP"; WRITE IRL
NOTE 8: UPDATE PC ; ACL→ACH, TB→ACL
NOTE 9: UPDATE PC, ACL→AOH ; TB→AOL
NOTE 10: ACL→AOH, DB→ACH, ACH→DO→ACL
NOTE 11: (ACL→DO) STAT
         UPDATE IF REGØ GRPØ

INPUT/OUTPUT AND DIAGNOSTIC ARRANGEMENTS FOR PROGRAMMABLE MACHINE CONTROLLERS HAVING MULTIPROGRAMMING CAPABILITIES

BACKGROUND OF THE INVENTION

The present invention relates to programmable machine controllers of the memory type and more particularly to arrangements for facilitating input/output, diagnostics and interprogram communications.

In several data processing and machine controller applications it is desired to have a plurality of programs operate independent of each other insofar as the respective program executions are concerned. However, each program may use signals common to other programs. In many apparatus the addressing of such common signals can require tables or unique addressing circuits to insure facile access to the common signals. Further, if such common signals are used in connection with externally controlled diagnostics, input/output, and so forth, the external apparatus must accommodate such unique addressing or be constructed to operate in a manner consistent with the programming structure within the programmable controller or data processor connected to such external apparatus. In many such applications the internal programming arrangement of a programmable controller may change as features are added to the device being controlled, additional or fewer functions are performed in the entire system or reprogramming is effected for reducing the size of memory required to contain the program signals. In moderate capability programmable controllers, the programming and hardware overhead of tables controlling I/O, etc. is to be avoided. That is, without such memory zoning the number of address bits for each memory access increases—increases hardware costs. Programming around the zoning limitations also requires memory space — added memory costs.

Further, a single machine may have diverse applications requiring diverse program structures or arrangements for maximizing efficiency of the programmable controller. In such diverse applications, the external diagnostic apparatus or other external apparatus would have to accommodate such diversity, hence increasing cost of the diagnostic tools as the programmable controller received wider usage.

The logical zoning of memory enables an instruction word to be used with fewer bits for addressing program memory as well as operand memory. Cost of data processing equipment has a direct relationship to the number of bits in an instruction word; that is, the longer the instruction word the more memory is required to contain the program and hence increase the cost of the data processor. Various techniques have been used for zoning memories. One so-called technique employs one byte of address field to be contained in an instruction word for accessing a certain portion or zone of memory. To access other zones so-called extended addressing techniques are used. That is, a special type of instruction may be required which contains two bytes of memory address for addressing the entire scope of memory. Using this technique, each instruction word used in connection with executing the program has one less byte of address field, thereby saving many bytes of program memory. Another form of zoning the memory is to use base plus or minus displacement addressing. In this system, an index or other form of register stores the base address to the full two byte memory addressing field. The instruction word then contains only the displacement which is either added or subtracted to the signal contents of the index register. This type of addressing is also called index addressing. Another form of zoning is so-called relative addressing wherein a portion of the program counter is the base address and the instruction word contains the displacement (plus or minus) from the program address counter which defines the memory location of an operand to be fetched. Yet another form of addressing called paged addressing uses the upper byte of the program counter as defining the zone in memory to be accessed and the address field in the instruction word for the lower portion of the address bits. In accordance with all of the above, it is readily seen that zoning of memory is useful for saving program memory space at the expense of slower execution of programs; i.e., to switch zones extended addressing or other forms of control instructions or accessing between various zones of memory are required to be interleaved within the program of instructions.

It is highly desirable that programmable controllers and data processors be made program structure independent for purposes of diagnostics and input/output connections. Such independence of program structures can facilitate construction and utilization of distributed processing systems.

SUMMARY OF THE INVENTION

Apparatus and methods employing the present invention provide for intercomputer transfer techniques which combine a memory of a local controlled computer having a first addressing basis, to a main controlling computer for facilitating I/O and program acquisition and for diagnostic purposes. A second addressing format may be employed by the controlling processor. Exchanges between the processors are independent of the program structure of the control processor. Such independence is achieved by assigning multiple addresses to each of the interconnecting registers such that the respective multiple addresses reside in corresponding work areas of memory of the controlled program normally associated with a single program within that computer.

Apparatus employing the invention include a data processing arrangement having a data processing unit with a given memory address space. A random access memory includes memory address zones such that each zone can be designated for use by any of programs within the data processing arrangement. A plurality of diagnostic or input/output registers are addressable by multiple addresses, one address to each of said zones with the addressing between zones being identical.

THE DRAWINGS

FIGS. 5 and 6 are charts showing the instruction repertoire of the FIG. 2 illustrated microprocessor.

DETAILED DESCRIPTION

Figure 1:
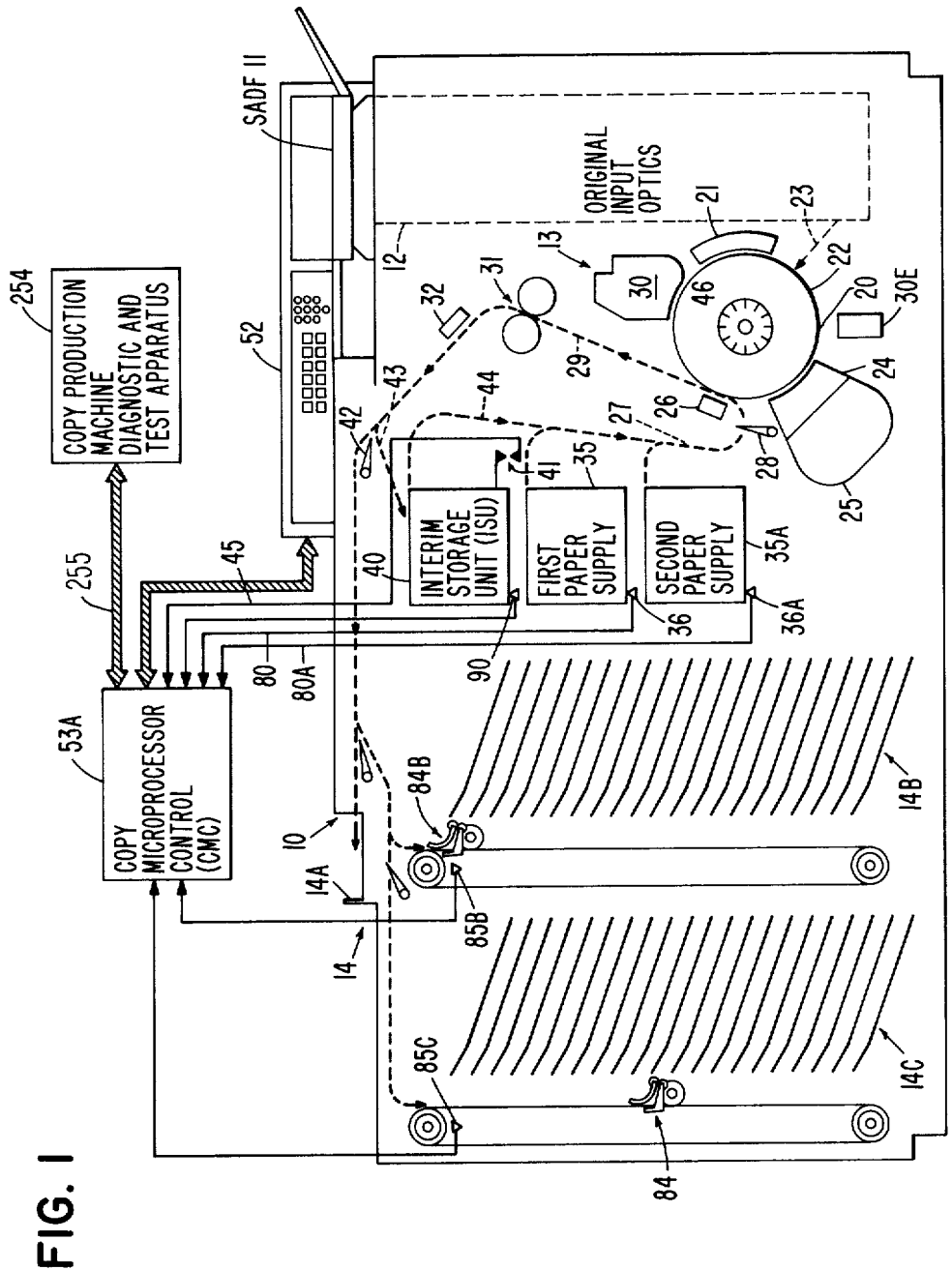
FIG. 1 is a diagrammatic showing of a preferred application of the present invention.

Referring now more particularly to the drawing, like numerals indicate like parts and structure features of the various diagrams. It is preferred that the invention be employed in connection with the copy production machine 10 as shown in FIG. 1. Copy production machine 10 employing a first version of the present invention includes a semiautomatic document feed (SADF) 11 for feeding manually inserted original documents to be copied. The document glass (not shown) in SADF 11 is scanned by known optical scanners in original input optics 12 to provide an illuminated image over path 23 to a later described copy production portion CPP 13. Copy production portion 13 transfers the line 23 indicated optical image to copy paper as will be later described, and supplies the produced copies to output portion 14 for pick up by an operator or for automatic transfer to other utilization apparatus (not shown). In a constructed version of the invention, output portion 14 includes a copy output tray 14A which receives all produced copies in a so-called noncollate mode. When the copy production machine 10 is to be used in an environment requiring automatic post copy production collation, a collator 14B is included in output portion 14. When the number of copies to be collated become relatively large, a second collator 14C is connected to the first collator 14B in tandem for receiving copies to be collated.

The copy production machine 10 includes an operator's control panel 52 having the plurality of manually actuable switches for introducing copy production parameters to copy production portion 13. Such parameters are well known and are not detailed. Copy production machine 10 is controlled by copy microprocessor unit CMC 53A. In accordance with the invention, diagnosis of copy production machine 10 by test apparatus 254 is facilitated by making operation of test apparatus 254 independent of the program arrangements in CMC 53A. Signalling between CPP 13 and CMC 53A is also facilitated by the present invention. Such a connection between CMC 53A and unit 254 is a distributed data processor system having operations enhanced by using the present invention.

Before proceeding further with the description of the invention, the operation of copy production portion (CPP) 13 is described as a constructed embodiment of a so-called xerographic copy production machine 10. Photoconductor drum member 20 rotates in the direction of the arrow past a plurality of xerographic processing stations. The first station 21 imposes either a positive or negative electrostatic charge on the surface of photoconductor member 20. It is preferred that this charge be a uniform electrostatic charge over a uniform photoconductor surface. Such charging is done in the absense of light such that projected optical images, indicated by dash line arrow 23, alter the electrostatic charge on the photoconductor member in preparation for image developing and transferring. The projected optical image from original input optics 12 exposes the photoconductor surface in area 22. Light in the projected image electrically discharges the surface areas of photoconductor member 20 in accordance with lightness. With minimal light reflected from the dark or printed areas of an original document, for example, there is no corresponding electrical discharge. As a result, an electrostatic charge remains in those areas of the photoconductive surface of member 20 corresponding to the dark of printed areas of an original document in SADF 11 (semiautomatic document feed). This charge pattern is termed a "latent" image on the photoconductor surface. Interimage erase lamp 30E discharges photoconductor member 20 outside defined image areas.

The next xerographic station is developer 24 which receives toner (ink) from toner supply 25 for being deposited and electrostatically retained on the photoconductive surface. The developer station 24 receives the toner with an electrostatic charge of polarity opposite to that of the charged areas of the photoconductive surface. Accordingly, the toner particles adhere electrostatically to the charged areas, but do not adhere to the discharged areas. Hence, the photoconductive surface, after leaving station 24, has a toned image corresponding to the dark and light areas of an original document in SADF 11.

Next, the latent image is transferred to copy paper (not shown) in transfer station 26. The paper is brought to the station 26 from an input paper path portion 27 via synchronizing input gate 28. In station 26, the copy paper (not shown) is brought into contact with the toned image on the photoconductive surface resulting in a transfer of the toner to the copy paper. After such transfer, the sheet of image bearing copy paper is stripped from the photoconductive surface for transport along path 29. Next the copy paper has the electrostatically carried image fused thereon in fusing station 31 for creating a permanent image on the copy paper. During such processing, the copy paper receives electrostatic charges which can have an adverse affect on copy handling. Accordingly, the copy paper after fusing is electrically discharged at station 32 before transfer to output portion 14.

Returning now to the photoconductor member 20, after the image area on member 20 leaves transfer station 26, there is a certain amount of residual toner on the photoconductive surface. Accordingly, cleaner station 30 has a rotating cleaning brush (not shown) to remove the residual toner for cleaning the image area in preparation for receiving the next image projected by original input optics 12. The cycle then repeats by charging the just-cleaned image area by charging station 21.

The production of simplex copies or the first side of duplexing copies by portion 13 includes transferring a blank sheet of paper from blank paper supply 35, thence to transfer station 26, fuser 31, and, when in the simplex mode, directly to the output copy portion 14. Blank paper supply 35 has an empty sensing switch 36 which inhibits operation of portion 13 in a known manner whenever supply 35 is out of paper.

When in the duplex mode, duplex diversion gate 42 is actuated by the duplex controlling circuits (not shown) in CMC 53A to the upward position for deflecting single image copies to travel over path 43 to the interim storage unit 40. Here, the partially produced duplex copies (image on one side only) reside waiting for the next subsequent single image copy producing run in which the copies receive the second image.

In the next successive single image run, initiated by inserting a document into SADF 11, the copies are removed one at a time from the interim storage unit 40, transported over path 44, thence to input path 27 for receiving a second image, as previously described. The two image duplex copies are then transferred into output copy portion 14. Switch 41 of interim storage unit 40 detects whether or not there are any copies or paper in interim storage unit 40. If so, an intermediate copy production state signal is supplied over line 45 to CMC 35A.

The copy production machine 10 control panel 52 having a plurality of lights and switches (most not shown) is connected to copier control circuits 53A which operate the entire machine 10 synchronously with respect to the movement of the image areas of photoconductor member 20. Billing meter M counts images processed for billing purposes. For example, paper release gate 28 is actuated synchronously with the image areas moving past developer station 24. Such controls are well known in the art and are not detailed here for purposes of brevity.

CPP 13 also has second or alternate copy paper supply 54 which supplies copy paper to input path 27 via paper path 55. Selection of paper supply 35 or 54 as a copy paper source is controlled from panel 52 by actuation of switches 56 labelled first or second paper supply. Selection is mutually exclusive. Control circuits 53A respond to switches 56 to actuate paper picker (not shown) in the respective copy paper supplies 35, 54 in a usual manner.

COPY MICROPROCESSOR CONTROL — FIG. 2

The programmable control 53A includes a programmable single chip microprocessor CMP 170 operating based upon a set of control programs contained in ROS control store 171, and uses working store or memory 172 as a main or working store. CMP 170 communicates with the other units of circuits 53A as well as CPP 13, SADF 11, output portion 14 and control panel 52; all communication is via the input registers 173 and output registers 174. In a preferred constructed embodiment, IO bus is eight bits wide (one character) plus parity. Address signals selecting which units are to send or receive signals with respect to CMP 170, as well as the other units, are provided by CMP 170 over 16 bit wide address bus ADC. A nonvolatile store CMOS 175 is a battery 175B powered semiconductor memory using CMOS construction. A clock supplies the usual computer type timing signals to units 170-175.

Figure 3:
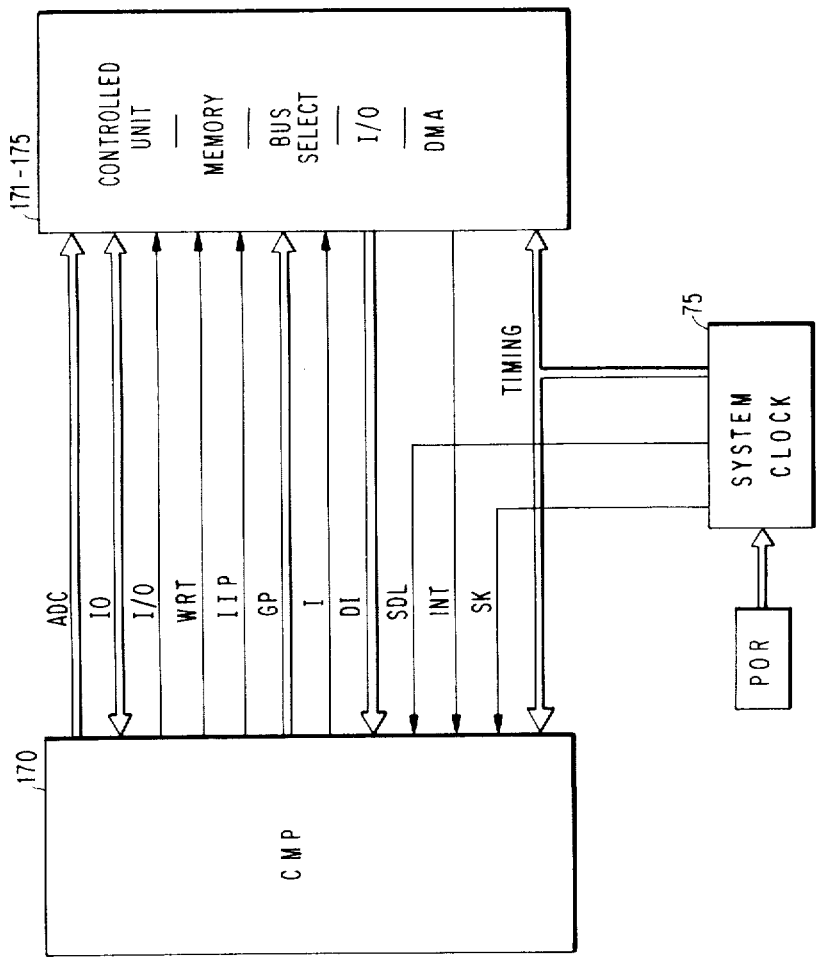
FIG. 3 is a diagrammatic showing of interconnection between a copy microprocessor CMP and a controlled unit. The controlled unit includes memory used in connection with practicing the present invention.
Figure 2:
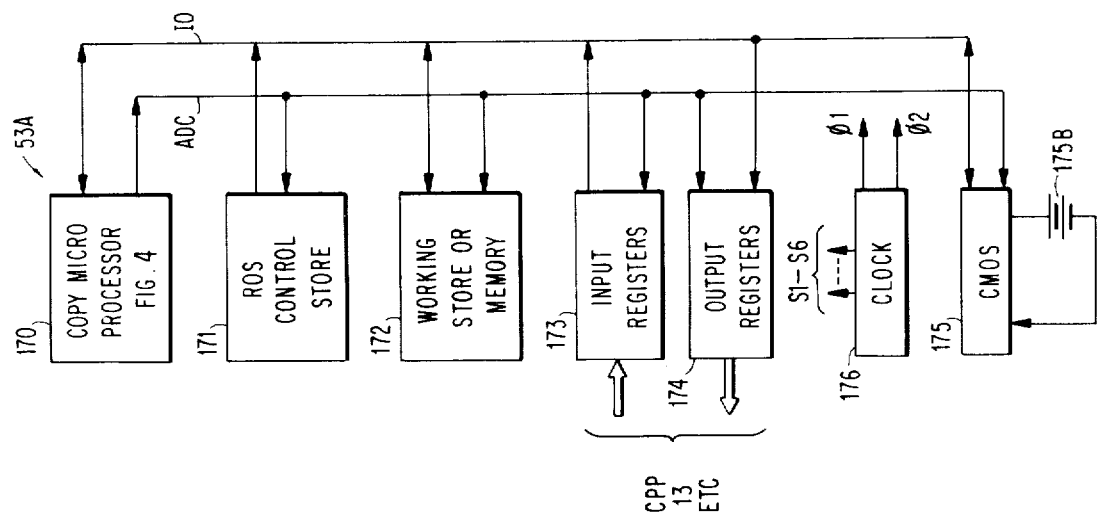
FIG. 2 is a block diagram of a programmable controller usable as the copy microprocessor control of the FIG. 1 illustrated apparatus.

Referring next to FIG. 3, the logical interconnections between microprocessor 170 with controlled units 171-175 are shown. All of the signals on the busses and individual control lines go to all units with the ADC signals selecting which controlled unit 171-175 is to respond for either receiving data signals or supplying data signals, respectively, on bus IO. Control line I/O indicates whether CMP 170 is supplying or receiving signals in bus IO. When the I/O line has a binary 1 indicating signal data or instruction signals are to be exchanged between the microprocessor 170 and an IO device while when it is a binary zero microprocessor 170 exchanges data or evaluation signals with memory.

WRT determines direction of signal flow, "1" means from microprocessor 170, while "0" means to microprocessor 170. Write line WRT indicates to memory 172 that signals are to be recorded in the memory. The IIP line, the signal IIP indicates interrupt in process, i.e., the microprocessor 170 program has been interrupted and microprocessor 170 is handling that interrupt. I is interrupt, SDL (data latch) is received from system clock 75, and means data signals from IO are to be latch in microprocessor 170. The line SK means sliver-killer which is a control signal for eliminating extraneous signals commonly referred to as slivers. These so-called signals result in interaction between successively actuated bistable circuits termed latches. Other timing signals for coordinating operation of all of the units 171-175 are received from system clock 75. Additionally, power on reset circuit POR activates system clock 75 to send out timing signals and control signals for resetting all of the units 170-175 to a reference state as is well known in the computer arts.

THE MICROPROCESSOR 170

Figure 4:
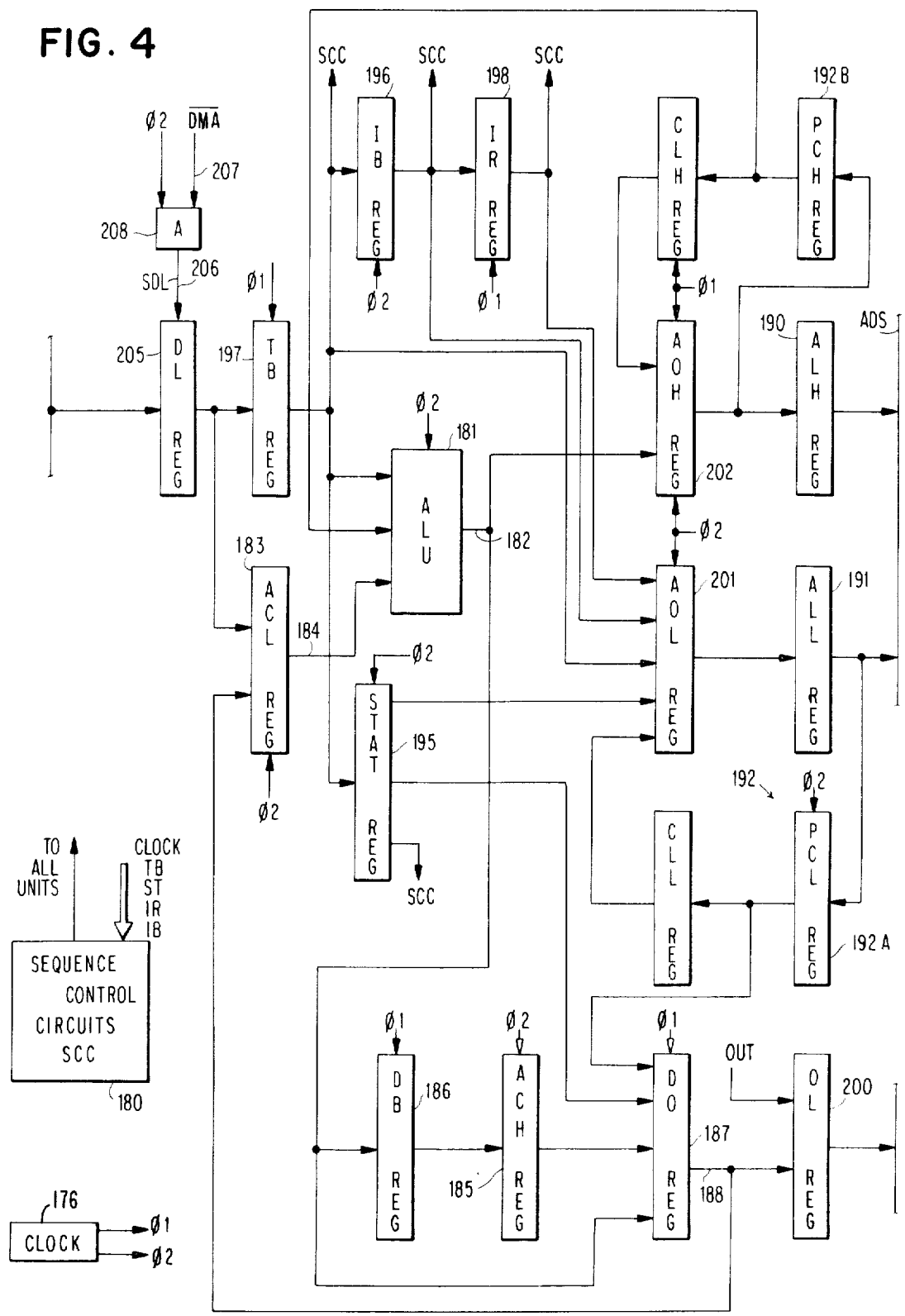
FIG. 4 is a diagrammatic data flow diagram of the copy microprocessor shown in FIG. 2.

Referring next to FIG. 4, the data flow of the microprocessor 170 is detailed. The sequence control circuits 180 are those logic circuits designed to implement the now to be described functions performable in the timing context of the following description. Such sequence control circuits SCC 180 include instruction decoders, memory latches and the like, for sequencing the operation of the FIG. 4 illustrated data-flow circuits, using a two-phase clock, $\phi 1$, $\phi 2$ from clock 75. The processor contains an 8 bit wide (1 character wide) arithmetic and logic unit ALU 181. ALU 181 receives signals to be combined during a $\phi 2$ and supplies static output signals over ALU output bus 182 during each phase 1. Operatively associated with ALU 181 is a 16 bit accumulator consisting of two registers, a low register ACL 183 which has its output connections over 8 bit wide bus 183 as one input to ALU 181. The second register of the accumulator is ACH register 185. When the microprocessor 170 operates with a two character wide or 2 byte wide word, the functions of ACL 183 and ACH 185 alternate. That is, in a first portion of the operation, which requires two complete microprocessor 170 cycles, as later described, ACL 183 contains the lower order 8 bits of a 16 bit wide word, while ACH 185 contains the upper 8 bits of the 16 bit wide word. ALU 181 first operates on the lower 8 bits received over ACL bus 184 and supplies the result signals over ALU output bus 182 to DB register 186. During this same transferring action, ACH 185 is supplying the upper 8 bits through DO register 187, thence over DO bus 188 to ACL 183. During the next ALU cycle, the upper 8 bits are operated upon. In the preferred and constructed embodiment, ALU 181 operates with two's complement notation and can perform either 8 bit wide or 16 bit wide arithmetic as above described. Eight bit wide logical operations are also performed.

ALU 181 contains three indicating latches (not shown) which memorize the results of arithmetic and logical functions for use in later processor cycles, such as conditional jumps or branches, and so-called input carry instructions. These three indicators are low, equal (EQ), and carry. Utilization of these indicators will be better understood by continued reading of the specification. Processor sequence control circuits 180 can entertain a single level of interrupt and includes an internal interrupt mask register (not shown) for disabling interrupts as is well known in the computer arts. The low order bits of the address signals supplied to bus ADS by the ALH register 190 (high order bits of the address) and ALL register 191 (the low order 8 bits of the address) are denominated as work registers. These registers are divided into 16 groups of 16, 2 byte wide, logical registers. A portion of ALL register 191 supplies GP signals for selecting which groups of registers are accessible by microprocessor 170.

As will be later detailed, microprocessor 170 requires two processor cycles for processing an I/O instruction. The first cycle is a set-up or address cycle while the second cycle is a data transfer cycle. The microprocessor 170 is designed to operate with a plurality of relatively slow acting devices; i.e., copy production machine 10. The time required for the microprocessor 170 to perform its functions is relatively small compared to the time required by the controlled devices. Accordingly, under clock 75 control, the microprocessor 170 can be effectively turned off to allow a controlled device to have exclusive use of the IO bus.

From examination of FIG. 4, it can be seen that all of the registers, being latches, will maintain their respective signal states whenever the clock phases, φ1 and φ2, are not supplied. Therefore, upon an interruption of the microprocessor 170 functioning by a controlled device 171-175, the signal state of the processor 170 enables it to begin operating again as if there had been no interruption.

The other registers in the microprocessor 170 are described with the instructions set for facilitating a better understanding of the interaction of these registers. The microprocessor employs instructions of variable length, 1, 2, or 3 bytes. The first byte of any instruction always includes the operation code, while succeeding bytes, numbered 2 or 3, contain address data or operand data, also referred to as immediate data.

The fastest instruction execution requires one microprocessor cycle while the longest instruction requires six processor cycles. An interrupt requires ten cycles to process. In all designations, bit 0 is the least significant bit.

INSTRUCTION REPERTOIRE

The instruction repertoire is described in groups of instructions, all of which have defined instruction word formats. The instructions are defined by the title, mnemonic, number of cycles required by the microprocessor to execute the instruction, number of operands (OP) and the number of bytes in the instruction word. Additionally, breakdown of the command structure of the first byte is given.

| REGISTER ARITHMETIC | | | | |
|---|---|---|---|---|
| Instruction | Mnemonic | Cycles | OP | Bytes |
| Add | AR | 3 | 1 | 1 |
| Subtract | SR | 3 | 1 | 1 |
| Load | LR | 3 | 1 | 1 |
| Store | STR | 3 | 1 | 1 |
| Load/Decrement | LRD | 5 | 1 | 1 |
| Load/Bump | LRB | 5 | 1 | 1 |

The instruction byte is divided into two portions. The most significant 4 bits indicate the instruction code while the lower 4 bits indicate a register within a group of 16 registers as the operand source. All operations are taken to the accumulator register. The Register Arithmetic is 2-byte wide arithmetic.

| BYTE ARITHMETIC | | | | |
|---|---|---|---|---|
| Instruction | Mnemonic | Cycles | OP | Bytes |
| Add | AB | 3 | 1 | 2 |
| Subtract | SB | 3 | 1 | 2 |
| Load | LB | 3 | 1 | 2 |
| Store | STB | 3 | 1 | 2 |
| Compare | CB | 3 | 1 | 2 |
| And | NB | 3 | 1 | 2 |
| Or | OB | 3 | 1 | 2 |
| Xor | XB | 3 | 1 | 2 |

The most significant first byte of the instruction indicates the instruction command while the second byte indicates operand address. The second byte indicates one of 256 bytes addresses in memory to be used in the arithmetic, i.e., a difference between the register arithmetic and the byte arithmetic is that a byte arithmetic obtains the operand from memory.

| IMMEDIATE ARITHMETIC | | | | |
|---|---|---|---|---|
| Instruction | Mnemonic | Cycles | OP | Bytes |
| Add | AI | 2 | 1 | 2 |
| Subtract | SI | 2 | 1 | 2 |
| Load | LI | 2 | 1 | 2 |
| Compare | CI | 2 | 1 | 2 |
| And | NI | 2 | 1 | 2 |
| Or | OI | 2 | 1 | 2 |
| Xor | XI | 2 | 1 | 2 |
| Group | GI | 2 | 3 | 2 |

The byte 1 format is the same as for byte arithmetic with the second byte being the operand data. In the last instruction, Group, GI, the immediate data selects the registers in the register group as will become apparent.

| ACCUMULATOR ARITHMETIC | | | | |
|---|---|---|---|---|
| Instruction | Mnemonic | Cycles | OP | Bytes |
| Add 1 | A1 | 2 | 0 | 1 |
| Subtract 1 | S1 | 2 | 0 | 1 |
| Shift Left | SHL | 2 | 0 | 1 |
| Shift Right | SHR | 2 | 0 | 1 |
| Clear | CLA | 1 | 0 | 1 |
| Transpose | TRA | 1 | 0 | 1 |
| Input Carry | IC | 1 | 0 | 1 |

All 8 bits of byte 1 are used to denote the function to be performed. All operations are conducted within the accumulator. Transpose instruction, TRA, swaps the high and low order register contents of accumulator registers 83 and 85.

| INDIRECTS | | | | |
|---|---|---|---|---|
| Instruction | Mnemonic | Cycles | OP | Bytes |
| Store | STN | 4 | 1 | 1 |
| Load | LN | 4 | 1 | 1 |

This is an indirect addressing set of instructions wherein the upper-most 5 bits indicate the function while the lower-most 3 bits signify which of 8 registers are to contain the address in memory to be accessed.

| BIT CONTROL | | | | |
|---|---|---|---|---|
| Instruction | Mnemonic | Cycles | OP | Bytes |
| Test/Preserve | TP | 1 | 1 | 1 |
| Test/Reset | TR | 1 | 1 | 1 |

The upper 5 bits of the instruction byte indicate the function while the lower 3 bits indicate which bits of the accumulator register will be tested.

INPUT/OUTPUT

ALU Condition Codes

The table below indicates the condition code in the ALU low, equal (EQ), or carry set as a result of the executed class of instructions as set forth in the table below.

| Instruction Class | Low | Equal (EQ) | Carry |
|---|---|---|---|
| Register Arithmetic | 16th bit = 1 | All bits (0–15) = 0 | Carry from 16th bit |
| Byte Arithmetic | 8th bit = 1 | All bits (0–7) = 0 | Carry from 8th bit |
| Bit Control | All bits exclusive of bit being tested = 0 | Tested bit = 0 | Unchanged |
| Shift Left | All bits = 0 | 0 was shifted out of the 16th bit | 1 was shifted out of the 16th bit |
| Shift Right | All bits = 0 | 0 was shifted out of the 1st bit | 1 was shifted out of the 1st bit |
| *Logical OR | Results of OR equals all ones | Bits set by OR were all 0's | Unchanged |
| **Logical AND | Preserved bits are all ones | Result of AND equals all 0's | Unchanged |
| Logical XOR | Result all ones | Result all zeroes | Unchanged |
| Input | All bits exclusive of bit 8 = 0 | 8th bit = 0 (Data Input and Output) | Unchanged |
| Input Carry | Always Reset | Carry = 0 | Unchanged |
| Compare | Number compared is greater than the low byte of accumulator | Number compared equals the contents of the low byte of accumulator | Carry from 8th bit |

*Test the set of bits (set by "or") to be all 0's, and the result for all ones. Does TBS of individual bits. The set bits are indicated by ones in the mask (logical OR).

**Test the preserved bits to be all 0's, all ones, or mixed. The preserved bits are indicated by ones in the mask (logical AND).

| Instruction | Mnemonic | Cycles | OP | Bytes |
|---|---|---|---|---|
| Input | IN | 4 | 1 | 2 |
| Output | OUT | 4 | 1 | 2 |

The two instructions use the first byte as a command and the second byte to address one of the 256 addresses on the busses, MI, DI, or IO.

BRANCHES

| Instruction | Mnemonic | Cycles | OP | Bytes |
|---|---|---|---|---|
| JUMP | J | 3 | 1 | 1 |
| JUMP NOT EQUAL | JNE | 3/1 | 1 | 1 |
| JUMP EQUAL | JE | 3/1 | 1 | 1 |
| BRANCH | B | 3 | 1 | 2 |
| BRANCH NOT EQUAL | BNE | 3/2 | 1 | 2 |
| BRANCH EQUAL | BE | 3/2 | 1 | 2 |
| BRANCH HIGH | BH | 3/2 | 1 | 2 |
| BRANCH AND LINK | BAL | 6 | 2 | 3 |
| RETURN | RTN | 5 | 1 | 1 |
| INTERRUPT | — | 10 | | |

The first three JUMP instructions are the three most significant bits for indicating the function. A fourth bit for indicating JUMP on plus or minus and the four lower order bits for indicating the address. In one notation, the plus indication, the binary 0 while the minus indication is a binary 1.

In the branch instructions, except for the BRANCH AND LINK first most significant bits together with the lower two significant bits, indicate the functions. The middle two bits indicate plus or minus 256 byte positions or ignore. The BRANCH AND LINK, a 3 byte instruction, selects one of four registers with the lower 2 bits of the command first byte and uses the upper-most 6 bits as a function indicator. The two bytes are a 16 bit address for the address bus with the second byte being the 8 low significant bits and the third byte being the 8 more significant bits. The RETURN instruction is merely a 1 byte instruction having the same format as the BRANCH AND LINK command byte. The interrupt is not an instruction, but a single signal received over interrupt line I.

A Jump instruction does not modify the accumulator 183, 185 or indicator bits whether taken or not. The program counter has had one added to it since it addressed the jump instruction. The program counter 192 includes PCL register 192A and PCH register 192B, hereinafter referred to as counter 192. If taken, the low 4 bits of the instruction first byte replace the low 4 bits of the program counter 92 and the high 11 bits are modified if necessary. The range of the instruction address change is −15 to +17 bytes measured from the jump instruction address. If the destination is within this range, it is only necessary to specify the low 4 bits absolutely of the destination address and a bit to describe which direction (0 for +2 to +17 or 1 for −15 to +0; the +1 condition is not realizable). The +1 condition is not useful because the processor goes to +1 if the jump is not taken (therefore, if it was valid the processor would go to +1 if the jump was taken or not).

In a branch instruction, the program counter 192 has been incremented to point to the second byte of the branch instruction word. The low 8 bits absolute of the destination program address are coded in the data byte (second byte). A code which describes how to modify the high 8 bits is coded into the instruction byte to: leave the high 8 bits the same, add one to the high 8 bits, or subtract one from the high 8 bits.

Branch on Equal and Branch on Not Equal test only the condition of the ALU 181 EQ indicator. Branch on Not low tests only the condition of the Low indicator. Branch on High requires that both the EQ and Low indicators be off.

The BRANCH AND LINK instruction is an unconditional branch that specifies the 16 bit absolute branch address of the program destination and a 2 bit number indicating a register to be used. The address of the next executable instruction (following the BAL) is stored in the register specified by the 2 byte number.

Interrupt is not a programmable instruction but is executed whenever the Interrupt Request line F is activated by an external device and an Interrupt mask in STAT register 195 is equal to zero. Interrupt stops the execution of the program between instructions, reads the new status (register group, interrupt mask, EQ, LOW, CARRY) from the high byte of REGISTER 8, stores the old status in the low byte of REGISTER 8, stores the address of the next instruction to be performed in REGISTER 0, stores the accumulator in REGISTER (without altering the accumulator), and branches to the address specified by the contents of REGISTER 12. The processor always specifies REGISTER GROUP 0 for interrupt. Interrupt requires ten processor cycles to complete. Register groups will be later described.

Return is an unconditional branch to a variable address and can be used in conjunction with the BRANCH AND LINK or to return to the main program after having been interrupted. Two bytes are read from the register specified to define the absolute branch address. A return using register $\phi$ of register group $\phi$ is defined as a return from interrupt. In this case the new status (EQ, LOW, CARRY, interrupt mask and register group) is read from the low order byte of REGISTER 8.

Arithmetic Group instructions operate with the 16 bit accumulator 183, 185 and 8 bit arithmetic-logic unit ALU 181 that are capable of performing various arithmetic and logical operations. Three condition indicators (LOW, EQ, CARRY) are set on the results of some operations. Two's complement 16 bit arithmetic is performed except for byte operations and some immediate operations which are two's complement 8 bit operations. The high order bit is the sign bit; negative numbers are indicated by a one in the sign bit position. Subtraction is accomplished by two's complement addition. Any arithmetic operation that results in a CARRY will set and CARRY latch even though the accumulator may not be changed.

Double Byte Arithmetic is performed with registers 0-15 of the current group for the Add, Subtract, Load and Store instructions. Load Register and Bump (add +1) uses registers 4-7 and registers 12-15. Load Register and Decrement uses registers 0-3 and registers 8-11. In the add register and subtract register instructions, AR, SR, the 16 bits of the addressed or specified register are added to or subtracted from the accumulator and the result is placed in the accumulator. EQ is set if the result is all zeros. Low is set if the high order bit is a one.

Load Register instruction LR loads 16 bit signal contents of the specified register into the accumulator 183, 185. The contents of the addressed register are unchanged. The ALU 181 indicators are not altered. The Store Register instruction, STR, stores the 16 bit contents of the accumulator 183, 185 into the specified register. The contents of the accumulator 183, 185 and the ALU 181 indicators are not altered.

In the Load Register and Bump, LRB, and Load Register and Decrement, LRD instruction, an absolute one is added to or subtracted from the contents of the specified register, respectively. The result is placed in the accumulator 183, 185 and the specified register. The indicators are updated as for an add or subtract, AR, SR.

For the Byte Arithmetic instructions, bytes 0-1023 of memory 64 are addressable by the Byte Arithmetic instructions. The directly addressable memory 172 is divided into four equal sections or zones, each section having eight equal sized groups of registers.

In the instructions AB, SB, CB, LB and STB, the 8 bit contents of the specified byte are added to, subtracted from, compared with, loaded into, or stored from the accumulator register ACL 183, respectively. The high order byte of the accumulator in ACH Register 185 is not disturbed. The ALU 181 condition indicators are set on the result of the single byte arithmetic: add, subtract, and compare. The results of all of the byte operations except compare CB and store STB are placed in the accumulator register 183. Store alters the specified byte in the active byte group. Compare is a subtract operation that does not alter the contents of the accumulator 183, 185. Byte arithmetic is 8 bit signed arithmetic.

In the byte NB, OB and XB instructions, the specified byte is logically ANDed, ORed, or EXCLUSIVE-ORed with the accumulator register 183 contents, respectively. The result is kept in the accumulator register 183. The EQ ALU 81 indicator is set:

for the AND operation if the result of the AND equals all 0's;
for the OR operation if the bits set by the OR were all 0's;
for the EXCLUSIVE-OR operation if there is identity between the byte and accumulator (result = all 0's). The LOW indicator is set:
for the AND operation if the preserved bits are all 1's;
for the EXCLUSIVE-OR operation if the byte and accumulator are bit for bit opposites (result = all 1's). The logical AND can test the mask selected to be all zeroes, all ones or mixed. The mask selected bits are indicated by ones in the corresponding positions of the byte used as the mask. The logical AND tests the bits that are preserved, while the logical OR tests the bits that are then set to one. If only one bit is selected then the logical OR does a test bit and set.

The Immediate Arithmetic instructions AI, SI, CI, LI, NI, OI and XI are the same as the byte operations except that eight bits of immediate data are used instead of the contents of an addressed byte and the Add and Subtract Operations are 16 bit signed arithmetic rather than 8 bit signed.

The Group Immediate instruction GI takes 8 bits of immediate data to alter the contents of the status indicator register 195 to select register groups and enable or inhibit interrupt. LOW, EQ, and CARRY condition indicators in ALU 81 are not altered. The immediate date (byte two) is divided into five parts. BITS 0-4 are the new register group bits (new register group is coded in binary). BIT 5 is the command bit to put BITS 0-4 into the internal register group buffer if the command bit is a zero. BIT 7 is the interrupt mask (a one masks out interrupts). BIT 6 is the command bit to put BIT 7 into the internal interrupt mask if the command bit is a zero.

The accumulator arithmetic instructions A1, S1, respectively add or subtract an absolute one to or from the contents of the accumulator 183, 185, and the result is left in the accumulator 183, 185. This is 16 bit signed arithmetic and the ALU 181 condition indicators are set on the result.

The accumulator instructions SHL and SHR shift the signal contents of the accumulator 183, 185 left or right one digit position or binary place, respectively. For shift left, the high order bit is shifted into the CARRY latch (not shown) in ALU 181 and a zero is shifted into the low ortder bit except when the previous instruction was an input CARRY. After an input CARRY, the CARRY latch condition before the shift is shifted into the low order bit. For shift right, the low order bit is shifted into the CARRY latch, and the state of the high order bit is maintained. When SHIFT RIGHT is preceded by input CARRY, the state of the CARRY latch before the shift is shifted into accumulator 183, 185 Bit 15. EQ condition indicator of ALU 81 is set if a 0 is shifted to the carry latch. LOW condition indicator of ALU 181 is set if the resulting contents of the accumulator 183, 185 is all 0's.

The accumulator instruction CLA clears the accumulator 183, 185 to all 0's. Transpose TRA exchanges the low order register 183 with the high order byte register 85 signal contents. The ALU 181 indicators are unchanged.

The accumulator instruction IC transfers the signal state of signal contents of the CARRY latch to the low order bit of the arithmetic-logic unit 181 on the next following instruction if the next instruction is an add, subtract, bump, decrement, shift left, or compare operation. CARRY is inputted to Bit 15 on a shift right. Interrupt is inhibited by this instruction until the next instruction is performed. The ALU 181 indicators Low is reset and EQ is set if the carry latch is a 0. If the input carry precedes any instruction other than the ones mentioned above it will have no effect on instruction execution. If the instruction following the input carry changes the ALU 181 condition indicators, then the indicator information from the input carry is destroyed.

The two Indirect Data Transfer instructions STN and LN can access registers 8-15. Load Indirectly instruction accesses the specified register and uses its contents as an address to fetch a byte of data and load it into the low eight bits (register 183) of the accumulator without disturbing the high 8 bits (register 185). Store Indirectly accesses the specified register and uses its contents as an address to store the low eight bits of the accumulator register 183 into the specified byte. The ALU 181 indicators are not altered.

The Bit Test or control instructions TR and TP take specified bit of the low order byte of the accumulator register 183 for test. The ALU 181 condition indicator EQ is set if the bit is a 0. Concurrently the bit is either reset or preserved in the accumulator, respectively.

The Input/Output instructions, IN, OUT, respectively transfer data to the accumulator register 183 from an I/O device (CPP 13 for example) and from the accumulator to an I/O device (CPP 13 for example). These instructions are two cycle operations. The first cycle puts the modified device code on the data out lines, the second cycle is the actual data transfer cycle; the low eight bits of the accumulator in register 183 are outputted to data in lines, and the device code is outputted on the address lines ADC. An OUT instruction does not change the ALU 181 indicators. On an IN instruction, EQ is set if the high order bit of the data inputted is a $\phi$. LOW is always reset. The Input/Output instructions can specify 256 devices each for data transfer. Generally, an I/O device will require more than one device address to specify different types of operations such as READ and TEST STATUS, etc.

A Power On Reset POR initialization places the processor in the following state:
Accumulator = $\phi$
Register Group = $\phi$
Interrupt Mask = 1
LOW, EQ, CARRY = X (unknown) The microprocessor 170 will begin operation by reading memory location 65,533.

MICROPROCESSOR INSTRUCTION EXECUTION

The processor 170 is pipelined to allow the memory 172 a full processor cycle for access time. To do this, the microprocessor 170 requests a read from memory several cycles ahead of when it needs a data byte. Several restrictions are maintained throughout the instruction set.

1. Each instruction must fetch the same number of bytes as it uses.
2. Each instruction must leave the microprocessor with the next instruction in the INSTRUCTION BUFFER, IB register 196.
3. At "Phase Two Time" at the beginning of Sequence Two, as later described, the TEMPORARY BUFFER (TB) 197 must contain the byte following the current instruction. (Note that this byte was fetched by the previous instruction.)
4. Each instruction decodes "TERM" (Terminate) as later described, which resets the instruction sequence counter (not shown) in clock 176 for CMP 176 and a separate sequence clock (not shown) for CMP 170 to Sequence one, allows the next fetch to be done from the IB 196 and loads to the next instruction into IR 198.
5. At "Phase Two Time" at the beginning of instruction Sequence Two the low accumulator register 183 and the high accumulator register 185 must contain the appropriate signals. (Note that the previous instruction may have had other data in these registers during its execution.)

Microprocessor 170 is built exclusively of latch logic. $\phi 2$ signals are the output of latches (or static decodes using the output of latches) that are strobed (sampled or transferred by a clock signal called a strobe) at $\phi 2$ time. $\phi 1$ signals are the outputs of latches (or static decodes using the outputs of latches) that are strobed at $\phi 1$ time. $\phi 1$ signals are used as the inputs to $\phi 2$ latches and $\phi 2$ signals are used as the inputs to $\phi 1$ latches.

Figures 7, 8:
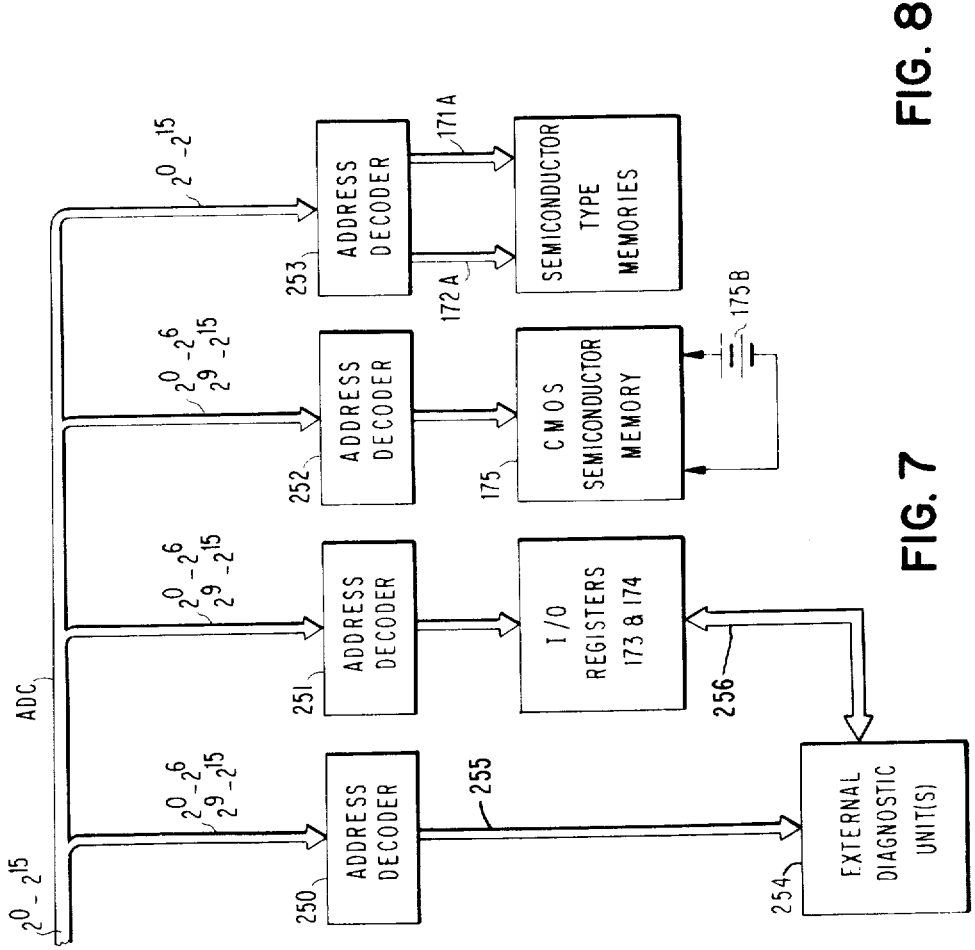
FIG. 7 is a diagrammatic showing of address decoding usable in connection with practicing the present invention within copy microprocessor CMP.
FIG. 8 is a diagrammatic showing of address space in the multizoned random access memory which employs the present invention.

The fetch decodes (memory references) are done from the IB register 196 at SEQUENCE 1 (SEQ 1), because the IR register 198 is loaded at $\phi 1$, SEQ 1 (FIGS. 7 & 8). At sequences, other than SEQ 1, the fetch decode is done from IR register 198. The fetch decodes are $\phi 2$ signals, and therefore are strobed at $\phi 1$. The output of the fetch decodes are strobed into registers ALL 191, ALH 190, OL 200 and SCC 180. The program counter 192 is updated from registers AOL 201 and AOH 202 at a $\phi 2$ time. The execution and designation decodes are $\phi 1$ decodes off the IR 198. These decodes are strobed at $\phi 2$ time into SCC 180 to set up the ALU 181 and DESTINATION strobes which occur at $\phi 1$ time. The output signals of ALU 181 are strobed into DB 186, DO 197 or AOH 202 in accordance with the instruction being executed. Then ACL 183 and ACH 185 are updated at $\phi 2$ so another ALU 181 cycle can begin. It takes three processor cycles from the start of a fetch decode to the time that the accumulator 183, 185 is updated. A pipelined configuration means that in some cases a processor can be executing three separate instructions at the same time, as is known in the computer arts.

Instruction Sequences

An instruction sequence chart in FIGS. 5 and 6 is a convenient shorthand catalog of the internal operation of the processor 170 during each sequence of each instruction. It can be a very useful tool in understanding the processor's operation. This glossary of terms provides the information necessary for proper interpretation of these charts.

General Information

The processor 170 is pipelined. While it is executing one instruction, it reads the next two bytes from memory 172. The first byte is guaranteed in IB 196 at the beginning of SEQ 1 and is used during SEQ 1 to provide three SEQ 1 decodes in SCC 180. At $\phi 1$, SEQ 1, IB→IR where it remains until the next $\phi 1$, SEQ 1. All remaining instruction decodes are done from IR 198.

The second byte is in TB 197 at the beginning of SEQ 2. This byte may contain immediate data for the current instruction or it may be a next instruction byte. If it is a next instruction byte, then the current instruction needs to read only one byte from memory to provide the required two bytes. This two byte read occurs for all one byte instructions.

All memory 172 accesses begin at $\phi 1$. The memory data is guaranteed in the data latch register DL 205 via bus IO for CMP 170 by $\phi 2$, i.e., one and one-half instruction execution sequences later. In the table below the memory timings for all instructions are set out together with the register destination (dest) from data latch register 205.

SCC 180 and ALU and Destination (ALU). The position of these two blocks within the sequence (i.e., left half or right half) has no meaning. Operations can occur at $\phi 1$ or $\phi 2$ in either category. $\phi 1$ occurs in the middle of a sequence. The $\phi 2$ is always a sequence boundary.

Control Logic Glossary

This is a list of terms which appear in the control logic CL columns.

WRITE - WRT

Indicates that a write into memory is initiated at Phase 1 rather than a read. A read is the default condition and requires no decodes. The WRT output line (FIG. 5) is active when WRT appears in the chart.

OUTPUT 1ST I/O - OUT 1IO

Indicates that the first cycle I/O code is placed on the output lines IO at $\phi 1$. Address lones AL9 and AL11 of ADC are driven by the decode IOC1. I/O line is active (FIG. 5).

OUTPUT 2ND I/O - OUT 2IO

Indicates that the second cycle I/O code is placed on the output lines IO to $\phi 1$. Address lines AL10 and AL11 of ADS are driven by IOC2. I/O line is active

| | MEMORY REFERENCE TIMING TABLE | | | | | |
|---|---|---|---|---|---|---|
| | 1 | | 2 | | 3 | |
| INSTRUCTION | START | DEST | START | DEST | START | DEST |
| LR AR SR | 1 | TB | 2 | TB | 3 | TB |
| LRE LRD | 1 | ACL | 2 | ACL | 3 | TB |
| STR | 1 | TB | — | — | — | — |
| AI SI | 1 | TB | 2 | TB | — | — |
| CI GPI LI | | | | | | |
| XI OI NI | 1 | TB | 2 | TB | — | — |
| CB AB SB | | | | | | |
| LB XB OB | | | | | | |
| NB | 1 | TB | 2 | TB | 3 | TB |
| STB | 1 | TB | 3 | TB | — | — |
| AI SI SHL | | | | | | |
| SHR | 1 | TB | 2 | TB | | |
| TRA CLA | | | | | | |
| IC TBP TBR | 1 | TB | | | | |
| BAL | 1 | ACL | 2 | X | 5 | TB |
| RTN | 1 | TB | 2 | ACL | 3 | TB |
| | 4 | TB | | | | |
| B00 IJO* | 1 | TB | 2 | TB | 3 | TB |
| B̄0̄0̄ ĪJŌ | 1 | TB | 2 | TB | | |
| INTERRUPT | 1 | TB | 5 | ACL | 8 | TB |
| | 9 | TB | 10 | TB | | |
| BLI | 1 | TB | 2 | ACL | 3 | TB |
| | 4 | ACL | | | | |
| BSI | 1 | TB | 2 | ACL | 3 | TB |
| IN OUT | 1 | TB | 3 | ACL | 4 | TB |

*A bar over a jump or branch instruction indicates jump or branch was not taken.

| Code | Operation (phase 2) | Decode |
|---|---|---|
| TB | DL→TB, ACL unchanged | None |
| ACL | DL→ACL, TB unchanged | TACL* or ITAL |
| X | None. ACL and TB are unchanged. Data will be lost unless SDL on line 206 is inhibited by DMA active on line 207. AND circuit 208 blocks $\phi 2$ from generating SDL signals on line 206. DMA means direct memory access as by registers 173, 174. | NOTB* or TBNS |

If IR 198 still contains the current instruction byte, the decodes are static. If the decodes are static. If the decode is for the overlap cycle of SEQ 1 (with the next instruction byte in IR 198), the ALU 181 condition latches are set during the last sequences (3-5) of the current instruction execution. The designated register is decoded by SCC 180. This special case is shown on the instruction sequence charts, FIGS. 7 and 8, by the terms TBNS or ITAL in the ALU columns.

The operation of the processor 170 in each sequence is divided into two categories; Control Logic (CL) of (FIG. 5).

TB→IB

At each $\phi 2$, SEQ 1 of every instruction, the signal contents of TB register 197 are transferred to IB register 196. The signal contents represent the next successive instruction following the current instruction.

IB SET

Same operation as TB→IB but the intent is to stop IB 196 from following TB 197 rather than save the contents of the TB 197. It is followed at the next φ1 by IB SET to "TRA".

IB SET TO "TRA"

Indicates that the reset inputs (not shown) on the IB 196 latches (not shown) are driven at φ1. CNT OR PORX drives an overlapping set on bits 0, 3 and 5 producing a "TRA" instruction code BAL, POR then execute a TRA to complete their respective operations.

(TERM)

Indicates the end of the instruction. SEQ 1 begins at the doubled line 220 on the chart. The sequence counter (not shown S1-S6) in clock 176 is reset by the decode TERM*.

PCI

Indicates a read from memory and a Program Counter Increment. This action is default condition and no decodes are needed.
φ1: PC+1→AO
φ2: AO→PC

PCNI

A "NO OP". Same as PCI except the PC 192 is not updated at φ2. The next PCI reads the same location again as though the first read did not occur. It is used because the processor lines signify something every φ1 and some instructions have no Read/Write or I/O requirements during sequence 1. SPC (Set PC) is inhibited for the jumps and branches, for the shift instructions, and for A1 and S1 instructions.

IBL, IRL, IRH

Indicates a memory access (read or write) to a register. IR (IB) means the register is sepcified by the low four bits of IR (IB). IB must be used during SEQ 1. IR 198 is used during all other sequences. L means the access is to the low byte of the register, H specifies the high byte. The decode IRSL* (IR selected) controls the formation of the address at φ1.

| Operation | Control |
|---|---|
| IB(0-3)→AO(0-3) | IBX (SEQ 1 only) |
| IR(0-3)→AO(0-3) | IRX (all other sequences) |
| L=0, H=1→AO(4) | ILH |
| GP(0-2)→AO(5-7) | RGX |
| GP(3)→AO(8) | R3 |
| 0→AO(9-14) | TBIR |

TB

Indicates a memory access using the contents of TB 197 as the address. The decode TBSL* (TB selected) controls the formation of the memory address at φ1.

| Operation | Control |
|---|---|
| TB(0-7)→AO(0-7) | TBX |
| GP(3)→AO(8) | R3 |
| 0→AO(9-14) | TBIR |

IRL+8

Same as IRL except 1→AO(3). It is used only is the RTN instruction to read the new status from memory. A one is placed on AL(3)

CAL HIGH BITS. TB→AOL

Indicates a memory access to a location being branched to. The decodes TBSL* and AOSL* control address formation at Phase 1. The high bits are calculated by the counter logic CL for PCH+1 and PCH and by the ALU for PCH-1.

Phase 1:

| Operation | Control |
|---|---|
| TB(0-7)→AO(0-7) | TBX |
| PCH+1→AO(8-14) | AOSL*=1, BNF=1 |
| PCH→AO(8-14) | AOSL*=1, BNF=0 |
| PCH-1→AO(8-14) | AOSL*=0 |

Phase 2:

CAL HIGH BITS. IR→AOL

Similar to TB→AOL above except only the low four bits of the IR are used, and bits 4 through 7 are calculated by the counter logic. The decodes IRSL* and AOSL* control address formation by driving other control lines.

Phase 1:

| Operation | Control |
|---|---|
| IR(0-3)→AO(0-3) | IRX |
| CL(4-7)→AO(4-7) | None (default) |
| PCH+1→AO(8-14) | AOSL*=1, JF8=1 |
| PCH→AO(8-14) | AOSL*=1, JF8=0 |
| PCH-1→AO(8-14) | AOSL*=0 |

Phase 2 AO→PC

OL, OH, 4L, 4H, 8L, 8H, 12L, 12H

Indicates a memory access to a register directly specified by the control SCC 180. Occurs only during interrupt. L indicates the low byte, H indicates the high byte.

Phase 1:

| Operation | Control |
|---|---|
| Register→AO(0-3) | CN2, CN3 |
| L=0, H=1→AO(4) | ILH |
| 0→AO(5-13) | TBIR |
| 1→AO(14) | R9 |

Update PC, ACL→AOH, TB→AOL

Indicates a memory 172 acess to an address specified by the contents of TB and ACL. The address is also placed in PC 192 at φ2. The address formation is controlled by AOTB* which drives other control lines. ACL 182 goes through ALU 181.

Phase 1:

| Operation | Control |
|---|---|
| TB(0-7)→AO(0-7) | TBX |
| ACL(0-6)→AO(8-14) | SAO |

Phase 2: AO→PC

ACL→AOH, TB→AOL

Same as above except PC 92 is not updated at Phase 2

Destination (Dest) Glossary

Items with boxes around them (e.g., ACL to DO→• ACL) do not always occur. On Branch or Jump taken the boxed destination occurs only when PCH 192B must be decremented to produce the proper address. The decrement occurs always, it just isn't loaded when it isn't needed. On all other instructions the boxed destination occurs if the instruction is also boxed.

Items in parentheses are "don't care" conditions which occur but are not part of the desired operation.

There are 7 standard data transfers:

|   | Phase 1 | Phase 2 | Decodes |
|---|---------|---------|---------|
| 1. | ALU→DO | — | None (default) |
| 2. | ALU→DO | DO→ACL | BF3 |
| 3. | ALU→DB<br>ACH→DO | — | DBDS* |
| 4. | ALU→DB | DB→ACH | BF2 |
| 5. | ALU→AOH<br>TB→AOL<br>ACH→DO | —<br>DB→ACH<br>DO→ACL | AOTB* |
| 6. | PCL→DO | — | PSCL . PSX |
| 7. | STATUS→DO | — | STSL . PSX |

Any variations of these are decoded separately as exceptions.

MISCELLANEOUS OPERATIONS

Update Status

The new status (REG GROUP, EQ, CARRY, LOW, INT MASK) which has been read from memory replaces the old status.

|  | Operation | Decode |
|---|---|---|
| (Phase 1) | TB→STATUS | UPST*, CHST, CHST* |
| (Phase 2) | — | |

Clear ACL & ACH
ACL 182 & ACH 185 are reset to zero by driving the reset inputs of the register latches (not shown).

| (Phase 1) | — | |
|---|---|---|
| (Phase 2) | 0→ACL,<br>0→ACH | CLAC |

Processor Forced to Execute TRA

The IB 196 has been reset to a TRA instruction. The sequence counter (not shown) in clock 176 is reset to SEQ 1 and the processor executes the TRA before the next instruction from memory.

Interrupt is prevented from occurring until after the TRA is completed.

AC7*→EQ

The EQ indicator is set by AC7* (used by I/O instruction), the bit 7 of ACL 183.

IC SETS IC

The Input Carry instruction sets the IC latch (not shown) in ALU 81.

"32"→DO

1→DO(5). Part of POR code.

ALU GLOSSARY

This is a list of terms which appear in the ALU category.

X

ALU NO-OP. No ALU decodes are provided. ALU 181 output at 182 defaults to all 1's.

ACL±TB

ALU 181 output is either ACL plus TB 197 or ACL 183 minus TB 197 depending on whether instruction was an ADD or a SUBSTRACT.

ACL×TB

ALU output is some logical combination of ACL and TB which is dependent on the actual instruction.

ACL

ALU output is ACL.

TB

ALU output is TB.

(MODIF)

ALU output is modified in some manner depending on the instruction. Example: On an In or OUT instruction, TB→DO except for bits 5 and 6 which are modified to reflect 0 and OUT respectively. ALU output is shown as TB (MODIF).

ACL INCR/DECR ALU output is ACL plus 1 or ACL minus 1 depending on the instruction.

PCH-1

ALU output is PCH minus 1.

PCH-1+CR

Same as PCH-1 except carry is added.

TBNS, ITAL

ALU NO-OP. The destination of data signals entering the processor at the end of Sequence 1 via register 105 must be specified by the previous instruction (although that instruction is no longer in the machine). To accomplish this action, two sets of latches are necessary. The ALU latches are used as the first set. The ALU latches drive the second set, TBNS and ITAL.

ITAL specifies the ACL as the destination. TBNS specifies no destination. The default condition (no decodes) specifies the TB as the destination.

Memory Addressing

The memory addressing of CMP 170 is shown in FIGS. 7 and 8. The address bus ADC goes to a plurality of address decoders 250-253. Decoder 250 decodes the indicated address bits for selecting external diagnostic unit addresses. Such external diagnostic unit addresses are shown in FIG. 8 as being respectively in address groups 7, 15, 23 and 31 of the lower 1000 byte address base of the memory address space. Each of the groups include 32 byte addresses. For example, group 0 in zone 0 includes addresses 0-31, and so forth. The address decoder 250 addresses external diagnostic or test units 254 which are connected to copy production machine 10 via plug (not shown). Diagnostics unit 254 is capable of exercising the copy production machine 10 via processor control in a manner beyond the scope of the present description. In one constructed version of the invention test unit 254 was a programmable System 7 computer manufactured by International Business Machines Corporation, Armonk, N.Y. System 7 unit 254 was connected to CMC 61 via plug type of cables represented by cable 255 (FIG. 1). Additionally, I/O registers 173, 174 can also be connected to test unit 254 via cable 256 for exchanging control information in addition to the diagnostic information exchanged over cable 255. How the present invention enhances operation between units 254 and 61 will be described later.

Decoder 251 addresses the IO registers which include input registers 173 and output registers 174. It will be remembered that input registers 173 are input only such that CMP 170 can only read the signal contents of such registers; it cannot record in such registers. In a similar manner, output registers 174 can only receive signals from CMP 170 for supplying control signals to CPP 13 and other units of copy production machine 10.

In accordance with the present invention, the address space for the diagnostic connections to test unit 254 as well as input/output registers 173, 174 is repeated; i.e., the same address bits will access any one of the diagnostic connections or input/output registers in the indicated four zones of the memory zone. Accordingly, not all address bits are supplied to address decoder 251 in the same manner that address bits were eliminated from address decoder 250 for enabling repeated diagnostic address space; i.e., each connection and each of the registers 173, 174 have multiple addresses with the memory address space. One advantage of this arrangement derives from the characteristics of the address selection circuits of CMP 170. Such circuits are faster if all of the addressing for program execution is maintained within the indicated FIG. 8 address zones. Switching zones delay processor action. Reasons for this delay are known in the prior art and are beyond the scope of the present description.

Address decoder 252 also has the same bits eliminated from its address field for addressing the nonvolatile store CMOS 175. CMOS address space is in groups 4 and 5 of zone 9; 12 and 13 of zone 1; 20 and 21 of zone 2; and 28, 29 of zone 3. Nonvolatile store CMOS 175 stores machine 10 operating parameter signals, error signals and the like.

Address decoder 253 addresses ROS control store 171 via address lines 171A and working store memory 172 via address line 172A to semiconductive type memories. All of the address bits from ADC are applied to decoder 253.

Returning now to FIG. 8, the remaining groups of registers (address space) in the lower 1000 byte address field of CMP 170 also are a part of working store 172 to be addressed via address lines 172A. All address bits are used to access these work registers for uniquely maintaining the signals therein with respect to various programs (not shown) in CMP 170.

CMP 170 operates within the above-described addressing structures in the following manner. A memory address zone is selected with the work registers in their respective address groups being used for storing intermediate results. References to input/output, diagnostics and the nonvolatile memory 175 is the same for all of the zones, thereby improving efficiency of CMP 170 in avoiding zone switching for accessing such universally used or replicated portions of the address space. External connections also are made more flexible in that such connections are independent of address assignments and program arrangements internal to CMC 53A. That is, when the external unit receives signals from or inserts signals into one of the replicated addressable units, all zones of memory 172 are simultaneously identically affected. It is understood that memory 172 may include address space not zoned; i.e., addressable as a contiguous set of registers. On the other hand, the zoning may continue throughout the memory address space with only the four zones shown in FIG. 8 need employ the invention to enhance operations in accordance with the invention.

A Multiprocessor Controller Employing the Present Invention

Figure 9:
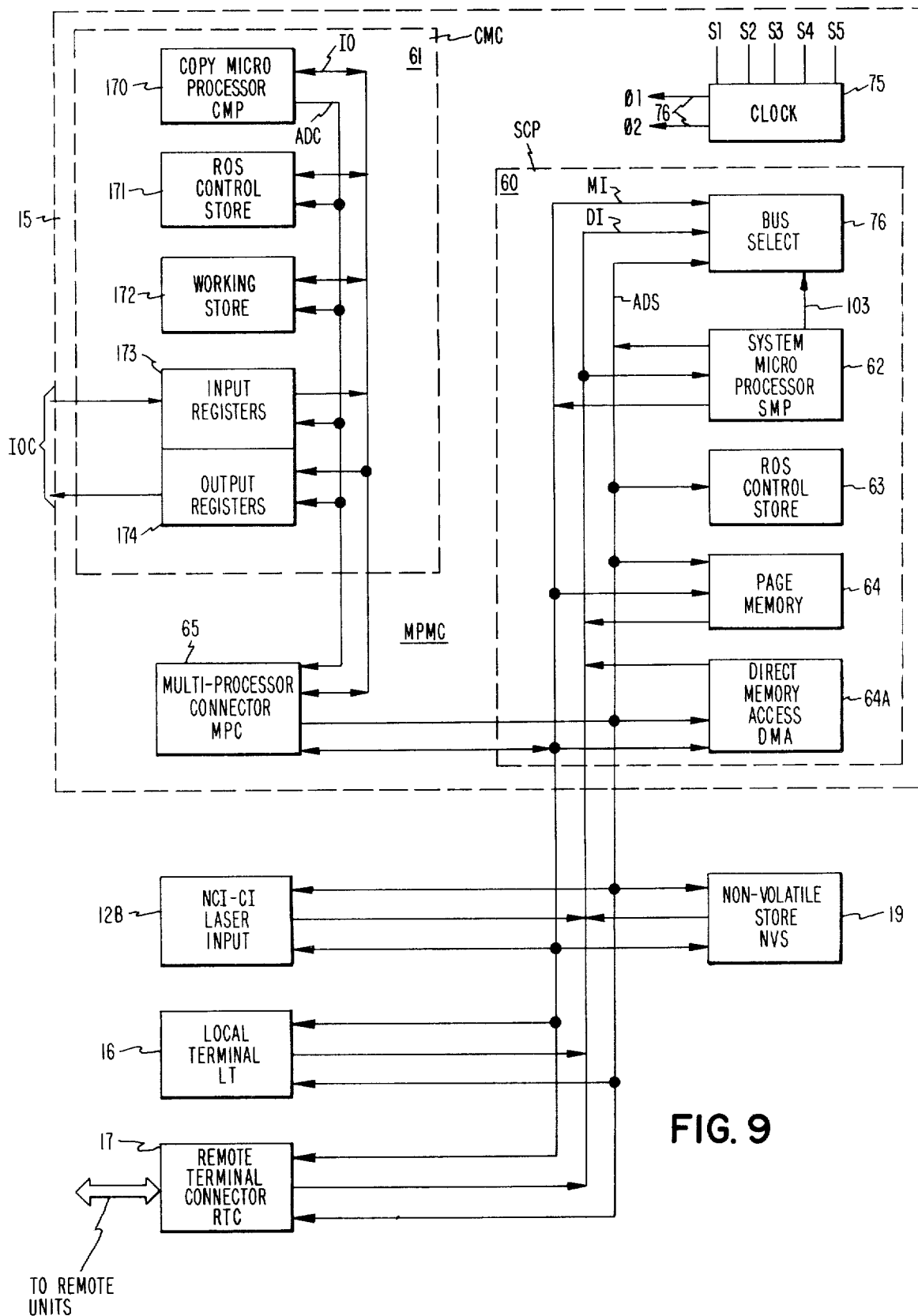
FIG. 9 is a diagrammatic showing of a multiprocessor arrangement in which the present invention may be employed.

The invention as above described refers to a single microprocessor CMP 170 having zoned memory space which includes a working store plus input/output registers 173, 174, having external connections to diverse units. A multiprocessor machine controller MPMC 15 as shown in FIG. 9 is designed to accommodate control of a copy production machine 10 which further includes additional word processing, text processing and data processing capabilities. For example, original input optics 12 may include a laser input 12B for converting NCI (noncoded information) or coded information (CI) into an optical image along path 23. A suitable image generator (not shown) forms a part of laser input 12B. That is, the image projected along line 23 can come from either SADF 11, document glass, or from laser input 12B. Additionally, a local terminal LT 16 may include a magnetic card reader/recorder (not shown) for supplying and receiving word processing or text signals from copy production machine 10. In this manner a word processing installation may be tied to a copy production machine via LT 16. In such an apparatus, a system control subsystem SCP 60 receives and supplies signals with respect to LT 16, performs text processing under program control in a system microprocessor SMP 62. SMP 62 is constructed identically to CMP 170, however, programmed quite differently for controlling not only SCP 60 but also interchange of signals to CMC 61 via multiprocessor connector 65. Also, SCP 60 may be connected to a communication line (not shown) via remote terminal connector RTC 17. Word Processing and data processing type of signals can be exchanged between copy production machine 10 and diverse types of units employing the above-mentioned signals.

SCP 60 includes a system microprocessor SMP 62 which executes a set of control programs contained in ROS control store 63, and uses page memory 64 as a main or working store. SMP 62 communicates with the other units in SCP 60 as well as peripheral units via a set of three unidirectional data transfer busses. The bus DI transfer data signals from the other units to SMP 62. In a preferred constructed embodiment, DI was eight bits wide (one character) plus parity, while signals emanating from SMP 62 were carried over bus MI to all of the other units. Address signals selecting which units ae to send to receive signals with respect to SMP 62, as well as the other units are provided by SMP 62 over 16 bit wide address bus ADS. The abovedescribed bus interconnections also provide signal communication between SCP 60 and the nonvolatile store 19 (magnetic storage disk), laser input 12B, local terminal LT 16, remote terminal connector RTC 17, and to CMC 61 via multiprocessor connector MPC 65.

CMC 61 via MPC 65 appears as an I/O device to the SCP 60 in the same manner as units 19, 12B, 16, and 17 appear as I/O devices. Processor intercommunication via MPC 65 requires a plurality of memory cycles in both SCP 60 and CMC 61. A clock 75 times SCP 60 and CMC 53A on a memory cycle synchronized basis. That is, page memory 64 and working store 72 have identical length memory cycles. The operation of the memories are in synchronism under control of a two-phase clock, phase 1, phase 2, supplied over lines 76 to all unit within MPMC 15. Timing connections are not shown for purposes of brevity. Additionally, clock 75 issues a series of S pulses, S1 through S5, for timing instruction execution of CMP 170 and SMP 62.

Additionally, it may be desired under program control, to logically interconnect the busses MI, DI and ADS for enabling signal transfers in later described desired paths. To achieve this result, but select circuit 76 under SMP 62 control, provides communication between the various busses. For example, signals received from MPC 65 on bus MI can be transferred through bus select circuit 76 to bus DI for receipt by SMP 62. Other changes on signal transfers via the busses can be easily envisioned. MPC 65 and bus select circuit 76 are similarly constructed. SMP 62 addresses these units during a first memory cycle, and commands same to establish data communication paths; i.e., from DI to MI, from IO to MI, etc. In following memory cycles, memory accesses result in data transfers between memory 64, NVS 19, store 172, registers 173, 174, etc.; one byte per cycle via MPC 65 or selector 76, or both.

The memory address space of CMP 170 may be set up to be 8K bytes. The lower 2K bytes can be constructed and addressed as shown in FIG. 8. The remaining 6K bytes are addressed as a unit on a byte basis for program control. When additional work registers are required in the work space as shown in FIG. 8, the replication of the I/O registers or the diagnostic space can be limited to less than all of the illustrated zones. For example, if the programming of CMC 61 is such that all input/output can be achieved by programming having work space in zones 0 and 1, then the replicated I/O in zones 2 and 3 can be dispensed with and that address space assigned as work registers. Other variations along these lines of course are also reasonably discernible.

For simplying the programming of SMP 62 the above-described breakdown of address space for CMP 170 addressing within CMC 53A is dispensed with. SMP 62 may have an address space within its instruction word capable of addressing 4K bytes. Accordingly, the memory space within CMC 53A, which includes the diagnostic registers and input/output registers 173, 174, is divided into first and second segments. Since the addressing of the memory units within CMC 61 can be of a supervisory type, the addressing can be limited to a plurality of bytes as a unitary addressable unit. For example, 8, 16, 32 or 64 bytes may be chosen as single addressable units. Accordingly, a single byte then can address all registers of CMC 61 contained by the address space in each of the two segments. Since MPMC 15 is byte-wide, such selection makes a convenient addressing arrangement for SMP 62. In this regard, it should be noted that the replicated addresses within the address space for CMP 170 addressing is also achieved for SMP 62; that is, input registers 173 are addressable by any one of four memory addresses by SMP 62, as well as CMP 170. All SMP 62 has to do is address any one of the I/O registers, diagnostic space, or CMOS addresses in any of the CMC 53A memory zones for achieving communication with any program using such memory space program within CMC 61.

Bus Controls

Figure 10:
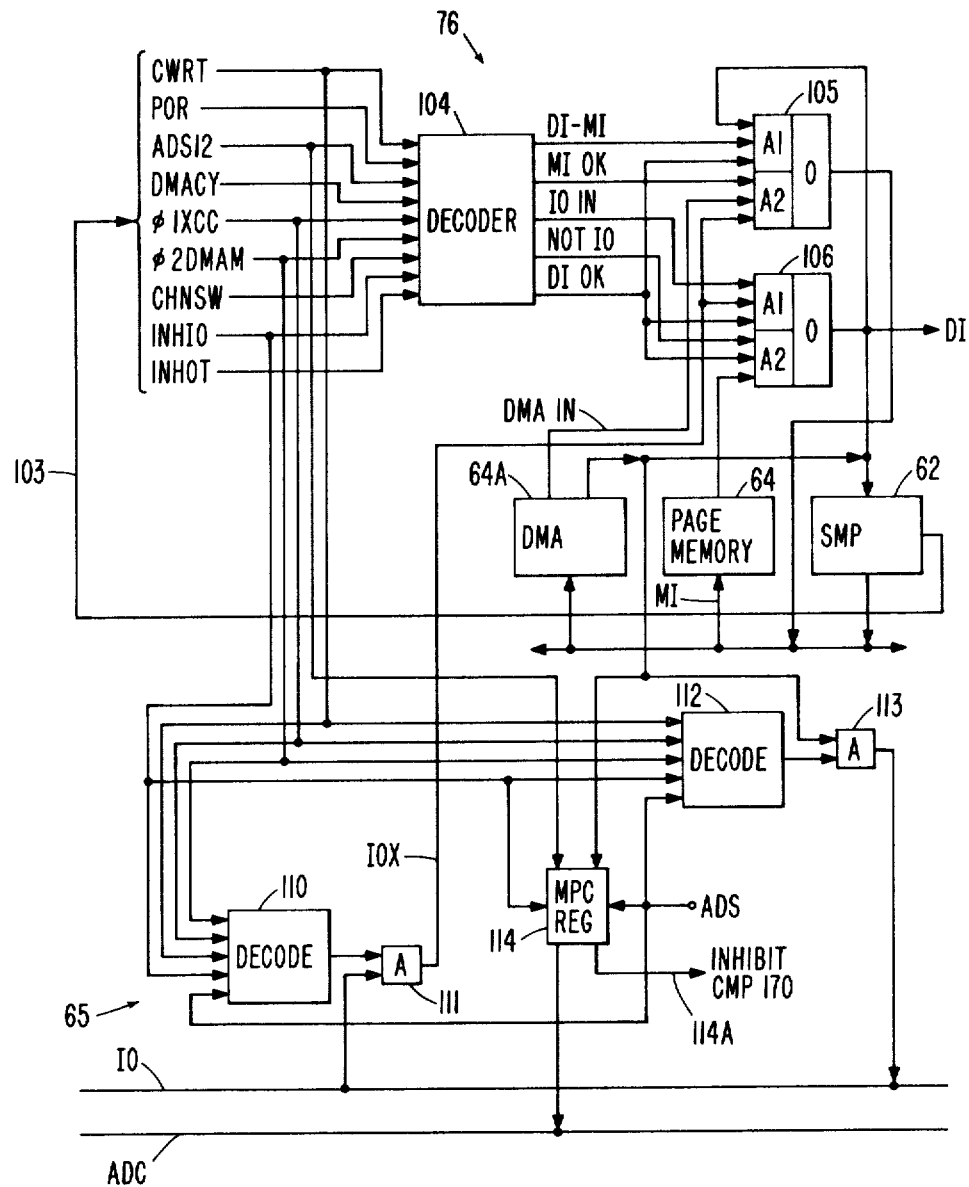
FIG. 10 is a diagrammatic showing of bus connectors usable with the FIG. 9 illustrated controller.

MPC 65 and bus select circuit 76 are both shown in FIG. 10. Bus select circuit 76 includes decoder 104 responding to signals from SMP 62 via control lines 103. Decoder 104 output signals in turn control a pair of AO circuits 105, 106 for selectively interconnecting the byte-wide busses MI and DI as well as connecting page memory 64 to DI via AO 106 and memory output line 102. With these connections, SMP 62 completely controls the bus interconnections and hence the data flow in MPMC 15 under microcode or software control. The lines 103 include CWRT which then active indicates that SMP 62 is supplying signals to be written either in page memory 64, input/output, etc. Line POR signifies that hardware circuits (not shown) are initiating a power on reset and that the bus connections are to be set up for initializing MPMC 15 for operation. In general, POR control causes a write into page memory 64 from MI as received from NVS 19. ADS 12 signal line signifies that the cycle of SMP 62 is in the address cycle; i.e., a memory address is being sent to page memory 64. DMACY indicates that DMA 64A has access to page memory 64. $\phi$1XCC, as well as $\phi$2DMAM are timing cycles corresponding respectively to $\phi$1 and $\phi$2 phases of the system clock. Additional gating for generating these signals is not shown for brevity. CHNSW carries a signal defining the time that data on DI is valid during system clock $\phi$2. Lines INHDI and INHIO are special test control signals for testing the circuits and hence, are beyond the scope of the present description.

Decoder 104 responds to the various lines 103 signals to actuate the AOs 105, 106 as described. The A1 input portion of AO 105 connects DI to MI in that the other inputs to the A1 input portion are DI and the output is directly connected to MI. Similarly, A2 input portion of AO 105 interconnects DI to MI under DMA memory access control. Additionally, decoder 104 detects from SMP 62 control signals that it is all right to connect to DI.

AO 106 selectively connects IOX from MPC 65 to MI or the output of page memory 64 received over line 102 to MI. The A1 input portion passes the IOX receive signal whenever the IO in line from decoder 104 is active and that DI is okay. Further, the A2 input portion is activated when decoder 104 signifies it is not IO; i.e., it is a memory reference.

With regard to the above statements, page memory 64 is continuously cycled and AO 106 selectively degates its outputs from bus DI during input operations; i.e., when signals from IOX are to be transferred to MI.

MPC 65 is constructed using a similar design philosophy. Decode 110 responds to SMP 62 lines 103 signals as indicated in the drawing and to the ADS address signals to activate AND circuits 111 to pass signals from bus IO of CMC to cable IOX for gating by AO 106. Similarly, decode 112 responds to the SMP 62 control lines 103 signals to the ADS signals to activate AND circuits 113 to pass the signals of bus DI to IO bus of CMC. In general, MPC 65 operates in two phases. The first phase is the addressing phase; the second phase is the data transfer phase. The address of the memory in CMC which includes ROS control store 171, working store 172, plus registers 173, 174 is set forth in MPC register 114 at ADS 12 time from bus ADS. Additional control signals are supplied over DI. MPC register 114 supplies its output signals to bus ADC for addressing the above-mentioned modules in CMC. On the next and successive cycles data is transferred through AND circuits 113 from DI to IO bus as indicated by the addresses supplied to ADC from MPC register 114.

MPC register 114 includes a control bit (not shown) that inhibits CMP 170 by supplying an inhibit signal over line 114A. this inhibit signal makes memory space of CMC 61 available to SMP 62 for exercising complete control, obtaining information, performing diagnostics and program loading.

While the invention has been particularly shown and described with reference to preferred embodiments thereof, it will be understood by those skilled in the art that various changes in form and details may be made therein without departing from the spirit and scope of the invention.

What is claimed is:

1. A data processing apparatus including a data processing unit having a given memory address space identified by an address field having a plurality of bits,
   a control memory connected to said data processing unit for receiving said plurality of bits and having registers addressable within a portion of said address space,
   a read/write memory connected to said data processing unit for receiving said plurality of bits and having registers addressable in a second portion of said address space, said read/write memory being divided into address zones requiring switching action by the data processing unit to address memory registers in various zones and a plurality of input/output registers connected to said data processing unit to be addressed thereby by said plurality of bits for being addressable in said memory address space common to predetermined ones of said address zones.

2. The data processing apparatus set forth in claim 1 wherein some of said input/output registers are dedicated for diagnostic purposes and include external connections for exchanging diagnostic signals thereover whereby diagnostic signals supplied to said dedicated input/output registers are addressable as a portion of said predetermined ones of said address zones.

3. The data processing apparatus set forth in claim 2 further including a programmable test controller connected to said some input/output registers.

4. The data processing apparatus set forth in claim 1 including memory address means for said read/write memory and said input/output registers, said memory address means being responsive to first predetermined ones of said bits to address registers addressable in one of said address zones and to second predetermined ones of said bits for identifying which zone is said one address zone and to less than said second predetermined ones of said bits to address said input/output registers whereby said input/output registers are addressable identically in a plurality of said address zones.

5. The data processing system set forth in claim 1 wherein said read/write memory has volatile memory characteristics, and
   a writeable nonvolatile memory having a plurality of addressable registers addressable in said memory address space common to predetermined ones of said address zones.

6. The data processing system set forth in claim 1 further including a second programmable unit connected to said input/output registers for exchanging signals therewith whereby a single signal exchange therebetween simultaneously appears in all said predetermined ones of address zones.

7. A cyclically operable machine having a programmable controller, an input portion, a production portion and an output portion connected to said controller for exchanging status and control signals therewith,
   the improvements including in combination,
   a programmable control unit having an address field with a plurality of bits defining an address space of a predetermined number of addressable locations,
   a memory connected to said programmable control unit for receiving said plurality of bits and having a plurality of registers addressable in zones of said address space, said memory being addressable by said address field and each zone being addressable by first predetermined ones of bits in said address field and registers addressable within each said zones addressable by second predetermined ones of said bits,
   third predetermined ones of said addressable registers being connected to said portions for exchanging signals therewith, said third predetermined addressable registers being addressable by said second predetermined ones of said address bits within each of said zones, and
   address means responsive to said address bits for addressing said third predetermined addressable registers in fifth predetermined ones of said zones and to ignore fourth predetermined ones of said third predetermined address bits such that said third predetermined addressable registers are addressable in all of said fifth predetermined zones.

8. The machine set forth in claim 7 wherein said production portion includes means to fix images on supports to produce copies of such images, and
   sixth predetermined ones of said third predetermined addressable registers including external connection means for being connected to test apparatus.

9. The machine set forth in claim 8 further including a second programmable unit, a second memory addressable by said second programmable unit,
   a multiprocessor connector connected to said second programmable unit and including means to address said locations within said defined address space, and
   means in said multiprocessor connector responsive to said second programmable unit to address said third predetermined addressable registers whereby both said programmable control units can exchange signals with said portions.

10. A programmable machine controller having a signal storing memory having a plurality of addressable registers, logic means connected to said memory for performing logic functions with respect to signals stored in said memory, a plurality of additional addressable registers,
    the improvement including, in combination;
    addressing means responsive to said logic means to address said memory,
    means in said addressing means establishing a plurality of zones of address space for said memory and additional registers, said addressing means creating address signals for said addressable additional registers,
    external connection means connected to said additional registers for enabling signal exchange with said additional registers, and said addressing means ignoring predetermined ones of said address signals for addressing said additional registers such that signal exchange with said external connection means is independent of said zones of address space and is addressable equally and identically within predetermined ones of said zones.

11. The method of controlling a copy production machine having a copy production portion, an output portion for receiving copies from said copy production portion, an image source portion for supplying images to said copy production portion for the production of copies of supplied images, a programmable controller connected to all said portions for controlling same in accordance with a stored program of instructions, a memory having a plurality of addressable registers some of which are connected to said portions, the steps of:
exchanging signals between said portions and said connected registers, zoning said memory into a plurality of operating zones having a predetermined number of register addresses, and
addressing said connected registers in a plurality of said zones.

12. For a cyclically operable machine having a cyclical operating portion, an output portion and an image receiving portion,
an improved programmable controller for operating said machine, comprising:
a programmable machine controller including a first addressable memory,
a programmable system controller connected to said image receiving portion for operating same,
a multiprocessor connector responsive to said system controller to address said first addressable memory within a predetermined address field and exchange signals therewith for enabling communication between said controllers,
a plurality of input-output registers in said machine controller connected to said operating portion and said output portion for exchanging signals therewith for monitoring operation thereof and controlling same, and
said multiprocessor connector including means for addressing said input-output registers within said predetermined address field whereby said system controller can monitor and control said copy production portion and said output portion independent of said copy microprocessor controller.

13. The cyclically operable machine set forth in claim 12 wherein said machine controller includes a bidirectional I/O bus, said first addressable memory, said input-output registers, and said multiprocessor connector being connected to said I/O bus,
a programmable machine microprocessor for performing logic operations including address generation and being connected to said bidirectional I/O bus,
an address bus extending from said programmable machine microprocessor to said addressable memory, said input-output registers and said multiprocessor connector for addressing same to enable signal exchange over said I/O bus, said mltiprocessor connector having means to supply address signals to said address bus including means to inhibit operation of said programmable machine microprocessor,
said programmable system controller including:
a programmable system microprocessor,
a system addressable memory,
a bus selector,
bus means extending between said system microprocessor, said system addressable memory, said multiprocessor connector, and said bus selector, respectively for exchanging signals between said system microprocessor and said system addressable memory and said bus selector, and
a system clock timing said microprocessors, bus selector, memories and connector for synchronously operating same in a succession of timing cycles.

14. The programmable controller set forth in claim 13 wherein said input-output registers are each addressable by a plurality of individual addresses from both said microprocessors.

* * * * *